Sept. 2, 1941.    L. G. HOLT    2,254,847
BACKBOARD FOR SUPPORTING ARTICLES
Filed Sept. 15, 1939
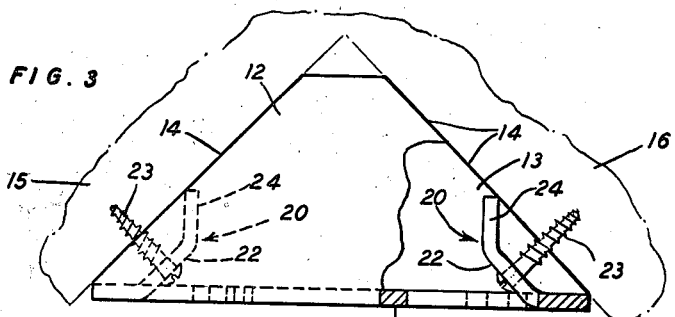
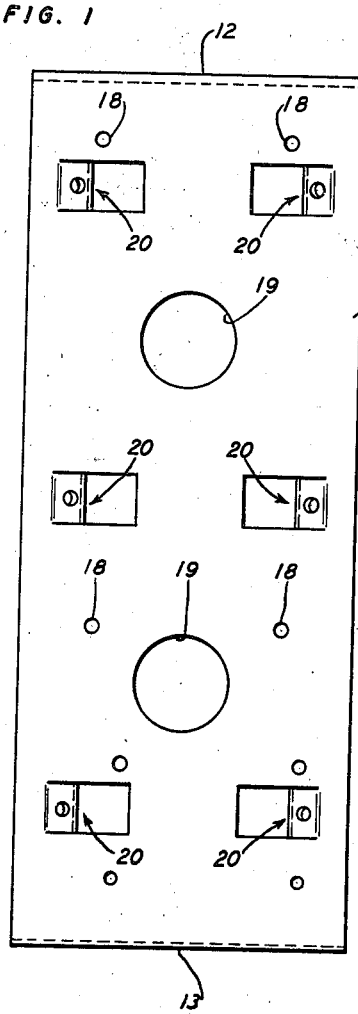
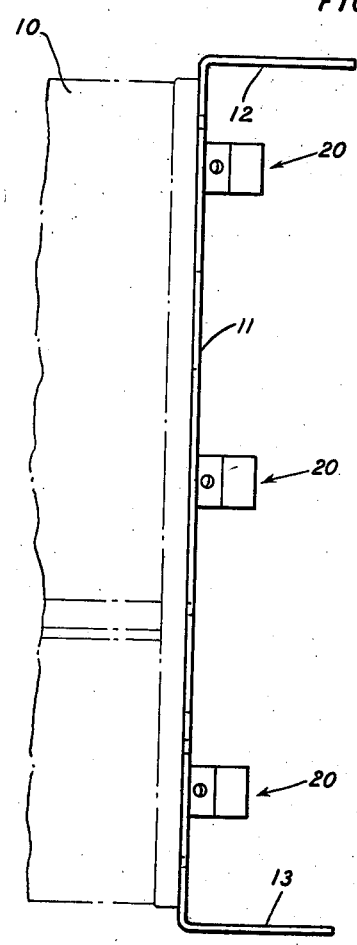
INVENTOR
L. G. HOLT
BY E.R. Nowlan
ATTORNEY Patented Sept. 2, 1941

2,254,847

UNITED STATES PATENT OFFICE 2,254,847

BACKBOARD FOR SUPPORTING ARTICLES

Leo G. Holt, Cranford, N. J., assignor to Western Electric Company, Incorporated, New York, N. Y., a corporation of New York Application September 15, 1939, Serial No. 295,031

5 Claims. (Cl. 248—222)

This invention relates to backboards for supporting articles, and more particularly to telephone substation backboards.

An object of the invention is to provide a simple, durable and practical backboard for supporting an article.

With this and other objects in view, the invention comprises a backboard for supporting an article at the juncture of two walls, the backboard being formed of a body of sheet metal with the top and bottom ends thereof bent at right angles to form substantially triangularly shaped flanges with side edges engaging the walls, and resilient ears punched adjacent the sides of the body and having central portions, apertured for mounting screws, positioned substantially parallel to their adjacent wall but transverse to the outwardly extending wall engaging portions thereof and the adjacent body portions.

Other objects and advantages will be apparent from the following detailed description when taken in conjunction with the accompanying drawing, wherein—

Fig. 1 is a front elevational view of the backboard;

Fig. 2 is a side elevational view thereof, and

Fig. 3 is a top plan view of the backboard shown mounted at the juncture of two walls, a portion of the backboard being broken away to illustrate the formation of the resilient ears.

A corner of a telephone booth has been chosen as a desired location for the mounting of a telephone substation of the conventional type, indicated at 10 in Fig. 2. It is, therefore, necessary to provide a flat surface of suitable and durable structure to serve as a backboard for the mounting of the substation.

The backboard for supporting the telephone substation consists of a body 11 of sheet metal having a top portion and bottom portion bent at right angles with respect thereto, as illustrated in Fig. 2, to form substantially triangularly shaped flanges 12 and 13, respectively. The edges 14 of these flanges extend at such angles from the body 11 to engage adjacent walls 15 and 16. The walls 15 and 16 extend at right angles with respect to each other and it will hereinafter be described that the backboard is disposed at the juncture of these walls. It is not meant by this statement that the backboard is disposed in the line at the juncture of the two walls but in engagement with the surfaces adjacent this line.

Various small apertures 18 are formed in the body 11 for use in mounting the substation 10 thereon after the backboard has been mounted at the juncture of the walls 15 and 16. Larger apertures 19 are provided for the passing of wires to the substation.

Resilient ears 20 are punched and formed into the shape shown in Fig. 3. These ears have central portions 22 apertured to receive mounting screws 23, the latter being used in mounting the backboard on the walls 15 and 16. The integral portions 24 of ears 20 are bent at an angle with respect to the central portions 22 to engage their respective walls 15 and 16. The central portions 22 lie parallel to the adjacent walls 15 and 16, while the portions 24 extend perpendicular to the body 11. It will be observed, by viewing Fig. 3, that the portion of the body 11 adjacent each ear completes a substantially U-shaped formation which may be termed as part of each ear, as each of these portions of the body adjacent each ear functions the same as the portions 24, they extending in a plane at right angles to the portions 24 and engaging their respective walls 15 and 16 to complete the formation of the substantially U-shaped ears. Therefore, each ear has a central portion parallel to its respective wall and transversely extending portions integral with the central portion and engaging their respective walls, one of these transversely extending portions of each ear being a portion of the body 11.

The apertures formed by the punching of the ears provide sufficient clearance for a screw driver or other tools necessary in mounting the backboard upon the walls. It will be observed that the backboard is formed entirely of one piece of sheet metal, providing a flat surface for the mounting of a substation thereon, providing further substantially triangularly shaped flanges 12 and 13 at the top and bottom thereof, both flanges being formed to fit snugly at the juncture of two walls, these flanges being firmly held in engagement with the walls by the mounting screws 23 through the aid of the resilient ears 20. The portions of the ears carrying the mounting screws are sufficiently resilient to allow the mounting screws to drive the backboard into intimate engagement with the walls 15 and 16 at the juncture thereof, yet these portions of the ears are supported against undue bending and possible breaking by the transversely extending portions on each side thereof which engage their respective walls, namely portions 24 and the adjacent portions of the body 11.

The embodiment of the invention herein disclosed is illustrative only and may be widely modified and departed from in many ways without departing from the spirit and scope of the invention as pointed out in and limited only by the appended claims.

What is claimed is:

1. A backboard for supporting an article at the juncture of two walls, the backboard comprising a body of sheet metal having opposite ends bent to form substantially triangularly shaped flanges with edges positioned to engage the walls, and means to secure the body to the walls and draw the edges of the flanges into intimate engagement with the walls.

2. A backboard for supporting an article at the juncture of two walls, the backboard comprising a body of sheet metal having opposite ends bent to form substantially triangularly shaped flanges with edges positioned to engage the walls, means to secure the body to the walls and draw the edges of the flanges into intimate engagement with the walls, and ears punched from the body to support the securing means.

3. A backboard for supporting an article at the juncture of two walls, the backboard comprising a body of sheet metal having opposite ends bent to form substantially triangularly shaped flanges with edges positioned to engage the walls and ears punched from the body adjacent the sides thereof, and means carried by the ears to secure the body to the walls.

4. A backboard for supporting an article at the juncture of two walls, the backboard comprising a body of sheet metal having opposite ends bent to form substantially triangularly shaped flanges with edges of one flange disposed in planes with the edges of the other flange and ears punched from the body and having portions spaced from the said planes and other portions extending substantially to the said planes, and means carried by the ears to secure the body to the walls.

5. A backboard for supporting an article at the juncture of two walls, the backboard comprising a body of sheet metal having sides disposed in definite planes so as to engage the walls and ears punched in the body with portions spaced from the said planes and other portions extending to the said planes to engage the walls, and means carried by the ears between the said sides of the body and the said engaging portions of the ears to secure the body to the walls.

LEO G. HOLT.